Fig. 1

INVENTOR.
ROBERT E. RAYMOND
BY
Schmieding and Fultz
ATTORNEYS

Fig. 2

INVENTOR.
ROBERT E. RAYMOND
BY Schmieding and Fultz
ATTORNEYS

Feb. 28, 1967  R. E. RAYMOND  3,306,230
CENTRIFUGALLY COOLED HYDRAULIC MACHINE
Filed June 2, 1965  11 Sheets-Sheet 6

FIG. 8

INVENTOR.
ROBERT E. RAYMOND
BY
Schmieding and Fultz
ATTORNEYS

Feb. 28, 1967

R. E. RAYMOND 3,306,230

CENTRIFUGALLY COOLED HYDRAULIC MACHINE

Filed June 2, 1965

INVENTOR.
ROBERT E. RAYMOND

BY Schmieding and Fultz

ATTORNEYS

Feb. 28, 1967 R. E. RAYMOND 3,306,230
CENTRIFUGALLY COOLED HYDRAULIC MACHINE
Filed June 2, 1965
11 Sheets-Sheet 8

INVENTOR.
ROBERT E. RAYMOND
BY
Schmieding and Fultz
ATTORNEYS

Feb. 28, 1967  R. E. RAYMOND  3,306,230
CENTRIFUGALLY COOLED HYDRAULIC MACHINE
Filed June 2, 1965  11 Sheets-Sheet 9

FIG.12

INVENTOR.
ROBERT E. RAYMOND
BY
Schmieding & Fultz
ATTORNEYS

INVENTOR.
ROBERT E. RAYMOND
BY
*Schmieding & Fultz*
ATTORNEYS

United States Patent Office 3,306,230
Patented Feb. 28, 1967

3,306,230
CENTRIFUGALLY COOLED HYDRAULIC
MACHINE
Robert E. Raymond, Zanesville, Ohio, assignor to
Hydro-Kinetics, Zanesville, Ohio
Filed June 2, 1965, Ser. No. 467,168
17 Claims. (Cl. 103—173)

This invention relates generally to hydraulic machines and particularly to a novel piston type variable displacement pump that incorporates internal centrifugal cooling.

This application is a continuation-in-part of my copending application Serial No. 244,093, now abandoned, filed December 12, 1962 which is in turn a continuation-in-part of my application Serial No. 161,554 filed December 22, 1961 now Patent Number 3,183,847, which is in turn a continuation-in-part of Serial No. 111,993 filed May 23, 1961 now abandoned.

In general, the pump of the present invention comprises a housing means that includes an axially shiftable cylinder barrel and a plurality of pistons mounted for axially reciprocating movement in the cylinder barrel. The variable flow delivery from the pump is accomplished by axially shifting the cylinder barrel and intake ports relative to the pistons.

The pump of the present invention utilizes a single axially shiftable cylinder barrel, in combination with a plurality of axially disposed pistons, to perform eight major pumping functions as follows:

(1) Provides cylinder chambers for pistons.
(2) Absorbs piston side reaction force.
(3) Provides axially shiftable inlet valve ports.
(4) Supports outlet valve assemblies.
(5) Supports the piston return means.
(6) Provides variable flow delivery by being axially shiftable relative to the pump housing.
(7) Includes flat surface in sliding sealed engagement with pressure biased outlet members for delivering oil from the axially shiftable cylinder barrel to the stationary pump housing.
(8) Provides a manifold for collecting oil from a plurality of the cylinders.

The cylinder barrel and associated mechanism comprise what may be termed a cartridge type pumping apparatus.

As another aspect of the present invention, the pump comprises a novel centrifugal cooling apparatus that includes a coolant flow return passage to reservoir that is provided with a check valve means for preventing return flow of unfiltered hydraulic fluid from said reservoir to the interior of the pump housing.

As still another aspect of the present invention, the pump comprises a novel cam means that includes an annular member that serves the multiple function of a piston driving means, a dynamic balance ring, and a seal ring between the eccentric and the inner wall of the pump housing.

It is therefore an object of the present invention to provide in a hydraulic machine of this general type a novel apparatus that provides internal centrifugal cooling for the pumping mechanism.

It is another object of the present invention to provide pumping apparatus that incorporates novel apparatus adapted to supercharge the intake ports of the pumping mechanism.

As another object of the present invention the novel pumping apparatus can be adapted to simultaneously provide both internal centrifugal cooling and supercharging of the intake ports of the pumping cylinders.

It is another object of the present invention to provide a novel pumping apparatus which incorporates piston driving, means that is dynamically balanced by the same novel structural arrangement that adapts said piston driving means to function as a centrifugal coolant pump.

It is another object of the present invention to provide a novel centrifugally cooled pump that includes a check valve means for preventing the return flow of unfiltered hydraulic fluid from reservoir to the interior of the pump housing.

It is still another object of the present invention to provide a centrifugally cooled pump that includes a novel cam means that functions as a piston driving means and a dynamically balanced centrifugal coolant pump.

In general, cooling of the pumping mechanism is uniquely accomplished by adapting the cam means to function as a centrifugal coolant pump that continuously delivers a flow of coolant, from an external source, through the pump housing and in heat exchange relationship with the pumping cartridge.

Supercharging of the intake ports of the pumping mechanism is accomplished by feeding the ports with the same pressurized flow of hydraulic fluid that is circulated, as mentioned above, through the pump housing as a coolant.

Further objects and advantages of the present invention will be apparent from the following description, reference being had to the accompanying drawings wherein preferred forms of embodiments of the invention are clearly shown.

Figure 1:
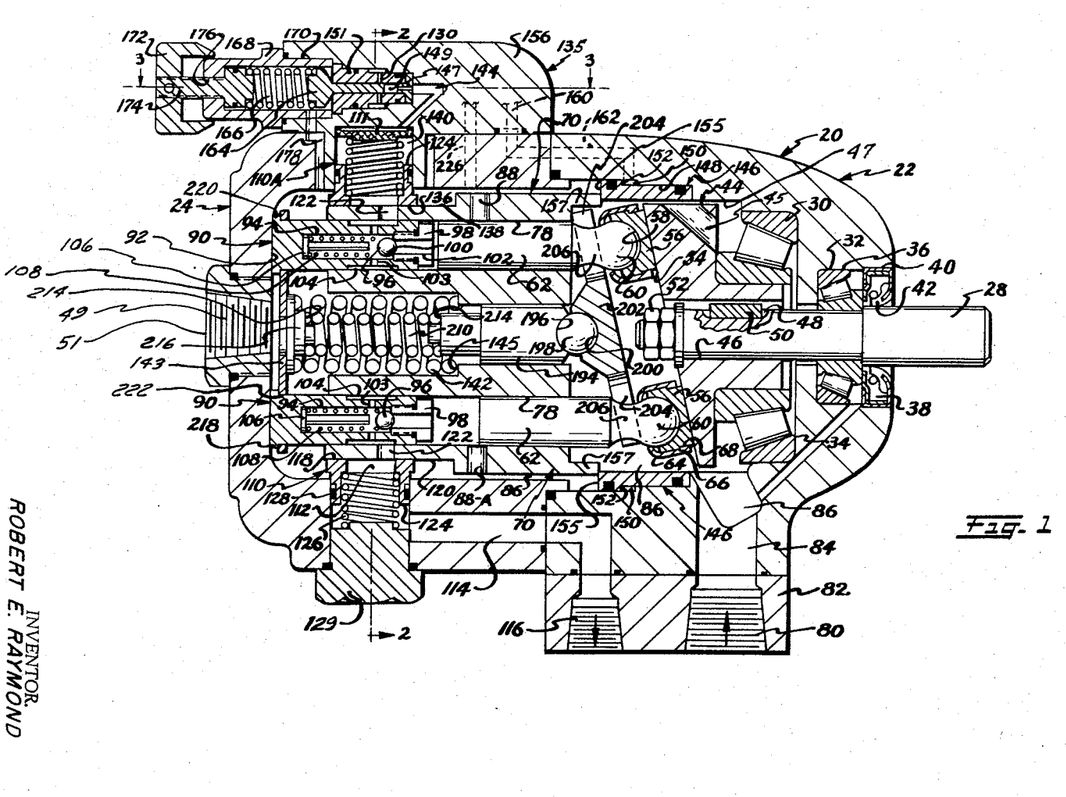
FIG. 1 is a side sectional view of a variable displacement pump constructed in accordance with the present invention, the section being taken along the plane 1—1 of FIG. 3.
Figure 2:
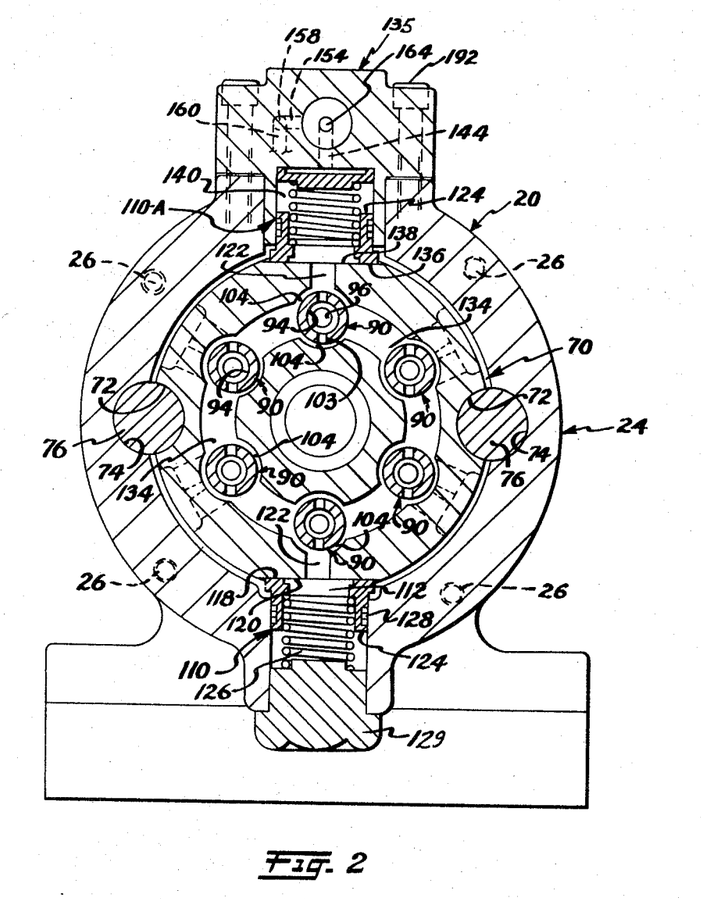
FIG. 2 is an end sectional view of the pump of FIG. 1, the section being taken along the line 2—2 of FIG. 1.
Figure 3:
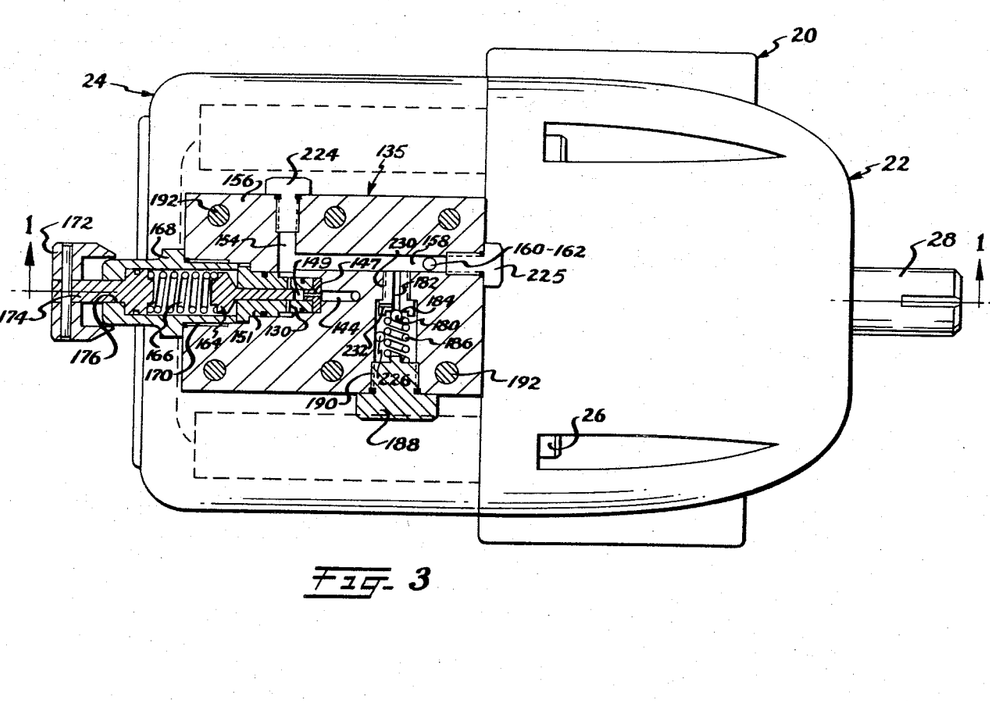
FIG. 3 is a top elevational view, partially in section, of the pump of the preceding figures; the section being taken along the line 3—3 of FIG. 1.

Referring in detail to the drawings, a variable displacement pump constructed in accordance with the present invention is illustrated in FIGS. 1–3 and comprises a housing means indicated generally at 20 that includes a front housing portion indicated generally at 22 and a rear housing portion indicated generally at 24. The two casing portions are joined together at the central portion of the pump by a plurality of studs 26 seen in FIGS. 2 and 3.

A drive shaft is mounted in the forward end of the housing means by tapered roller bearing assemblies 30 and 32 which assemblies are pressed into recesses 34 and 36.

An oil seal 38 is pressed into a recess 40 in the housing and includes an annular resilient element 42 that wipes the periphery of drive shaft 28.

As seen in FIG. 1, the inner end of drive shaft 28 carries a cam means indicated generally at 44 which includes a central bore 46 provided with a keyway that receives a key 50 for preventing rotation of cam means 44 relative to shaft 28. The cam means is retained on shaft 28 by a pair of nuts 52 which are tightened into lock relationship on a threaded inner end portion on shaft 28.

Figure 10:
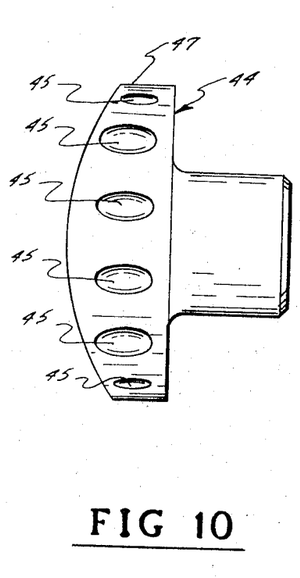
FIG. 10 is a side elevational view of a cam and centrifugal pumping means comprising a portion of the apparatus of the present invention.
Figure 11:
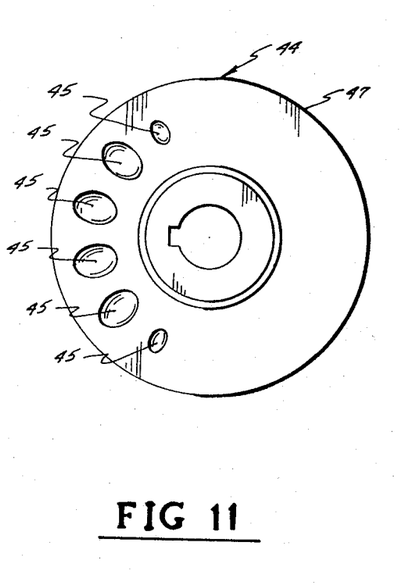
FIG. 11 is a front elevational view of the cam means of FIG. 10.

With reference to FIGS. 1, 10 and 11 cam means 44 is provided with a plurality of axially inclined holes 45, the wall surface of which forms centrifugal pumping surfaces. The periphery 47 of cam means 44 is arranged closely to confront an adjacent annular casing surface 47 whereby the cam means divides the interior of the casing means into a forward chamber that receives fluid at tank pressure from intake port 80 and a return chamber 86 that forms an annular coolant passage along cylinder block 70. A coolant outlet port 49 serves to release the flow of coolant oil back to tank.

With continued reference to FIG. 1, cam means 44 includes an inclined surface 54 which engages a plurality of nylon shoes 56, the latter including sockets 58 which form pivotal ball joints with ball-shaped ends 60 formed on a plurality of pumping pistons 62.

Each of the nylon piston shoes 56 is surrounded by a metal casing 64 that is crimped around the ball-shaped end 60 of its respective piston. Each metal casing 64 includes an inwardly extended annular protrusion 66 that snaps into an annular recess 68 formed in the base of the nylon shoe portion.

With reference to FIGS. 1 and 2, a cylinder barrel indicated generally at 70 is axially slideably mounted within the casing means by means of a plurality of guide grooves 72 and 74, which receive longitudinally extending bearing members 76.

The members 76 may best be described as side rail bearings and their function to not only absorb piston side thrust reaction imposed on the cylinder barrel but, in addition, these side rail bearings function as keys against cylinder barrel reaction and thereby serve to absorb torque.

Side rail bearings 76 are of substantially the same length as cylinder barrel 70 and are preferably formed of nylon or other similar synthetic rod material.

Pistons 62 are disposed in respective barrel cylinders 78 which receive low pressure oil or hydraulic fluid via intake 80 in base 82, passage 84 in front housing portion 22, the inner chamber 86 within the housing and the intake ports for each cylinder, two of which are seen at 88 and 88–A in FIG. 1.

Intake port 88–A is shown with its respective piston 62 at the bottom of a stroke at which position the piston has uncovered intake port 88–A and drawn fluid into its cylinder. Intake port 88, however, is closed since its respective piston is at the top of its stroke.

As seen in FIGS. 1 and 3, each of the cylinders 78 includes a respective reaction plug, indicated generally at 90, in free self-aligning engagement with the inner end surface 92 of rear housing portion 24.

Each reaction plug 90 is provided with a central bore 94 that carries an outlet ball check valve 96 which is freely retained in bore 94 by a threaded plug 98.

Each threaded plug 98 includes a seat portion 100, a longitudinal passage 102, and a radial passage 103, the latter communicating with an annular passage 104 formed in the outer wall of reaction plug 90.

With continued reference to FIG. 1, the bore 94 in each reaction plug 90 includes a valve stop 106 and a compression spring 108 which serves to limit the stroke of the ball and bias it towards a closed position.

It will be noted that bore 94 of each reaction plug 90 includes a blind end that forms a fluid reaction surface for forcing the reaction plug against the housing means.

Pressurized oil from cylinders 78 is discharged to the exterior of the pump, in a unique manner through a pressure biased outlet member 110 which includes a central passage 112 that communicates with high pressure discharge passage 144 that in turn leads to an outlet hole 116 formed in base 82.

As seen in FIG. 1, outlet member 110 includes a foot portion provided with a surface 118 that is in slideable sealed engagement with a longitudinally extending surface 120 formed in the outer wall of cylinder barrel 70.

It will be noted from FIG. 1, that when cylinder barrel 70 is axially shifted relative to the housing means 20 an outlet port 122 formed in the cylinder barrel always remains in communicating with central passage 112 in outlet member 110 notwithstanding axial movement of cylinder barrel 70.

With continued reference to FIGS. 1 and 2, pressure biased outlet member 110 includes a piston surface 124 that causes the pressurized hydraulic fluid in passage 112 to bias the surface 118 on outlet 110 downwardly into sealed engagement with longitudinally extending surface 120 on barrel 70. If desired, outlet member 110 can be structurally modified so as to be hydraulically balanced in accordance with the teachings in my copending application Serial No. 244,093.

A spring 126 augments the biasing force of the high pressure oil on piston surface 124 and also serves to retain surface 118 in sealed engagement with surface 120 at low pressures and at the outset of operation.

The outer peripheral surface of outlet member 110 is provided with an annular seal 128 and a threaded plug 129 is screwed into the hole forming passage 112 and includes an inner protrusion that forms a retainer for the end of spring 126.

With reference to FIGS. 1 and 2, pressurized oil from the pumping cylinders 78 is released from longitudinal passages 102 in reaction plugs 90 via a plurality of small radially extending passages 103, FIG. 2, annular recesses 104, an annular manifold 134, cylinder barrel outlet port 122, radial passage 112 through outlet member 110, passage 114, and base outlet hole 116 to the load.

Pressurized oil is also released to a variable displacement hydraulic control unit indicated generally at 135 by a second pressure biased outlet member 110–A, FIGS.

1 and 2, which is identical to outlet member 110 previously described. It will be noted that outlet member 110–A includes a base surface 136 that is hydraulically biased into sealed engagement with a longitudinally extending surface 138 formed in the outer wall of cylinder barrel 70. Outlet member 110–A is biased downwardly against longitudinally extending surface 138 by a force exerted by a piston surface 124, pressurized oil in a passage 140.

Refering to FIG. 1, cylinder barrel 70 is constantly biased towards the front of the housing means by a control spring 142 which is interposed between a spider 143 and an annular shoulder 145 formed on cylinder barrel 70.

Cylinder barrel 70 is hydraulically shifted axially against the biasing force of control spring 142 by means of an annular cylinder barrel driving piston indicated generally at 146 in FIG. 1. Piston 146 is mounted in a cylinder 148 and forms therewith an annular chamber 150 for receiving pressurized oil in a manner later to be described. A small annular piston surface 152 of large diameter provides sufficient axial force with low control pressures to shift cylinder barrel 70 against the force of control spring 142.

With continued reference to FIG. 1, the piston 146 includes a rear end 155 in forced transmitting engagement with an annular base portion 157 on cylinder barrel 70.

Referring particularly to FIGS. 1 and 3, pressurized oil is delivered through the control apparatus 135 to the barrel driving piston and cylinder 146–150 via passage 140, passage 144, orifice 147, spool cylinder 148, radial passage 130 in spool housing 151, lateral passage 154 in control block 156, longitudinal passage 158 in control block 156, vertical passage 160 is control block 156, and passage 162 in the pump housing which connect to barrel driving cylinder 150.

Figure 4:
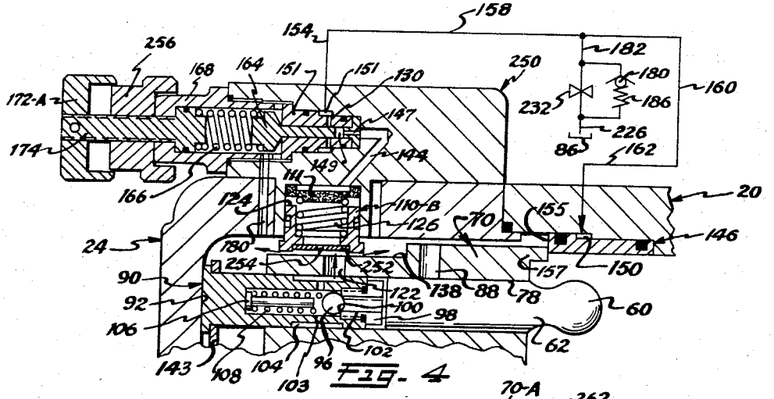
FIG. 4 is a partial side sectional view of the pump of the preceding figures with a surge control apparatus mounted thereon, the section being taken along the vertical plane through the center of the pump.

The above described passages for conducting the control flow of oil to cylinder barrel driving cylinder 150 are diagrammatically illustrated in FIG. 4.

Referring particularly to FIGS. 1 and 2, spool housing 151 carries a longitudinally shiftable spool member 164 that is normally biased towards a closed position by a spring 166, the latter being contained in a spring housing 168 that is threaded into control block 156 at a threaded hole 170. Compression spring 166 is selectively compressed or compressed by manipulating a control knob 172 that includes a shank 174 in threaded engagement with spring housing 168 at a threaded hole 176. As seen in FIG. 1, a radial passage 178 extends through control block 156 and rear housing portion 24 to provide a drain back to tank for any hydraulic fliud that may leak between the outer surface of control spool 164 and the inner surface of spool cylinder 149.

With reference to FIG. 3, the down stream control pressure for the control circuit is limited to some predetermined low pressure valve by a ball check valve 180 which communicates with the control circuit via a passage 182 in control block 156 and is biased towards its seat 184 by a compression spring 186. A threaded plug 188 in hole 190 provides means for installing relief valve 180 and also serves as a spring retainer.

With continued reference to FIG. 3, and the diagrammatic portion of FIG. 4, a small flow of oil is continuously drained back to tank via a small orifice 232 and radial passage 226. Momentary high flows during shock conditions are drained back to tank via check valve 180 and passage 226.

Control block 156 is mounted on housing 20 by means of a plurality of studs 192 as seen in FIG. 3. It will be understood that other types of control apparatus various types of load conditions can be readily mounted on the pump merely by unscrewing the studs and replacing control block 156 with a modified version.

The pumping pistons 62 are returned and biased against cam means 44 in a novel manner, by means of a single centrally disposed piston return rod 194, FIG. 1, which includes in arcuate socket 196. A ball 198 fits into socket 196 of rod 194 and also into a socket 200 formed in a piston return yoke 202. Yoke 202 includes a plurality of radially extending slots 204 that fit around neck portions 206 and the bases of the pistons 62. Piston return yoke 202 applies force to the rear sides of the ball-shaped piston ends 60 and in turn receives force from piston return rod 194 via the pivot joint formed by ball 198 and sockets 196 and 200. A compression spring 210 is disposed between a shoulder 214 on the rear end of piston return rod 194 a shoulder 214 on a spring retainer plug 216 which in turn bears against the front side of spider 143. Spider 143 is restrained from rearward movement by the shoulders 220 formed on the ends of reaction plugs 90. It should be pointed out that reaction plugs 90 are fitted loosely into respective holes 222 in spider 143 and are in free engagement with the inner surface 92 of the housing whereby the plugs are self-aligning with respect to pump cylinders 78.

The ends of passages 154 and 158 in control block 156 are closed by threaded plugs 224 and 225 respectively.

Reference is next made to FIG. 4 which illustrates a modified control apparatus indicated generally at 250 which includes shock relieving apparatus. The shock relief feature is provided by adding a shock detection plate 252 provided with a relatively small orifice 254 to a modified pressure biased outlet member 110–B. During normal operating conditions orifice 254 is large enough to handle the control flow and outlet member 110–B remains pressure biased downwardly into sealed engagement with surface 138 due to the outlet pressure exerted on piston surface 124.

During shock conditions, however, the high rates of flow exceed the capacity of orifice 254 and develop large forces across shock detector plate 252 in a direction that lifts outlet member 110–B away from surface 138 on the cylinder barrel. When outlet member 110–B separates from the cylinder barrel, the high volumetric shock flow passes between member 110–B and surface 138 and into the low pressure zone of the housing. When the shock condition subsides spring 126 and the unbalanced hydraulic force on outlet member 110–B return it immediately into sealed engagement with surface 138 on the cylinder barrel.

The components of control apparatus 250 which correspond to those previously described in connection with control apparatus 135 are designated by identical numerals. The passages, valves, and orifice leading to cylinder barrel driving cylinder 150 are illustrated diagrammatically.

FIG. 4 includes a modified control pressure adjusting screw 172–A that includes an elongated shank portion 174–A on which is mounted a calibrating cylinder 256 provided with indicia for selectively setting control screw 172–A at a predetermined control pressure setting.

Figure 5:
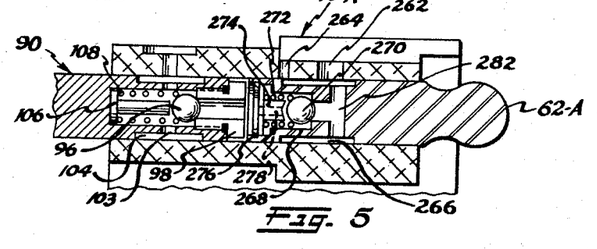
FIG. 5 is a side sectional view of a modified cylinder barrel and piston assembly for the pump of the preceding figures, the section being taken along a vertical plane through the center line of the assembly.

Reference is next made to FIG. 5 which illustrates a modified piston and cylinder block arrangement which prevents cavitation and can be utilized, at additional expense, where extremely low noise levels are desired.

The apparatus of FIG. 5 includes a modified cylinder barrel 70–A provided with a main intake 262, which handles the main intake flow, and a small by-pass port 264.

With continued reference to FIG. 5, the assembly includes a modified piston 62–A provided with an annular recess 266 that at all times communicates with main inlet port 262.

Piston 62–A includes a valve cavity 268 that contains a check valve 270 normally biased against its seat by a compression spring 272. The ball is retained in the cavity by a plug 274 held in place by a snap ring 276.

Figure 6:
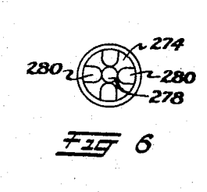
FIG. 6 is an end elevational view of a modified piston comprising a portion of the assembly of FIG. 5.

As is best seen in FIG. 6, plug 274 includes a central passage 278 and peripheral slots 280 that communicate with main intake port 262 via transverse passage 282 when check valve 270 is open on the suction stroke.

In operation, when the pump of FIGS. 1-3 is driven by a prime mover cam means 44 reciprocates pistons 62 which, on the suction stroke, draw oil into the cylinders 78 via inlet passage 84, chamber 86 formed by housing 20, and intake ports 88.

On the compression stroke pistons 62 deliver oil from cylinders 78 to outlet port 116 via passages 102 in plugs 98, check valves 96, radial passages 103, annular grooves 104, manifold 134, passage 112 in hollow outlet member 110, outlet passage 114, the outlet port 116 connected to the load.

Some of the pressurized oil in manifold 134 is delivered to variable displacement control apparatus 135 for shifting annular piston 146 and cylinder barrel 70 in the manner previously described.

A constant pressure at the load is obtained by arranging spool 164 to open only when a predetermined selected load pressure is exceeded. Control knob 172 is adjusted to compress spool control spring 166 so as to bias spool 164 with the proper force to permit its opening when the predetermined selected operating pressure is exceeded. When the pressure at the load rises above the operating pressure oil from the manifold passes through passage 144 and orifice 147 to spool cylinder 149. The increased pressure in the spool chamber overcomes the preset control force exerted by spool control spring 166 whereby the spool is shifted to the left, as viewed in FIG. 1, and oil is released through radial passages 130 in spool housing 151 and thence through the previously described passages to the barrel driving cylinder 150. This shifts annular piston 146 and cylinder barrel 70 to the left, as viewed in FIG. 1, whereby intake ports 88 are moved to the left, relative to piston 62. This decreases the effective strokes of the pistons since the intake ports 88 are closed later in the return stroke of the pistons whereby a smaller charge of oil is translated. With less oil being pumped per piston compression stroke the pressure is automatically cut back and when the pressure drops to the preselected control pressure the biasing force exerted by spool control spring 166 shifts spool 164 to the right, as viewed in FIG. 1, whereby the spool closes radial ports 130 and the flow of oil to barrel driving cylinder 150 is terminated.

Since barrel driving cylinder 150 is always exposed to low flow rate leakage back to tank via orifice 232 and passage 226, previously described, control spring 142 can shift cylinder barrel 70 and barrel driving piston 146 towards the right, as viewed in FIG. 1, and thereby shift intake port 88 to the right to provide a longer effective stroke for each piston. When this occurs, more oil is delivered to the load per piston stroke. It will, therefore, be understood that control spring 142 constantly biases the pump apparatus towards a higher pressure producing configuration. As soon as the predetermined desired load pressure is exceeded, however, the previously described pressure producing action of spool 164 occurs.

In view of the above, it will be understood that the pump operates with spool 164 in a threshold configuration relative to radial passages 130. The moment the manifold pressure exceeds the predetermined pressure desired at the load, spool 164 departs from its threshold piston and opens to release oil to barrel driving cylinder 150. Conversely, the moment the manifold pressure drops below the predetermined value desired at the load spool 164 maintains radial passages 130 closed whereby oil can drain from cylinder barrel driving cylinder 150 and permits control spring 142 to drive cylinder barrel 70 to the right, as viewed in FIG. 1. This increases the volumetric delivery of oil per piston stroke whereby the pressure at the load is returned to the predetermined value.

The operation of the modification of FIG. 4 is identical to that of the modification of FIGS. 1-3 with the exception that the FIG. 4 pump is adapted to relieve shock conditions by the inclusion of a shock relief apparatus in the form of a modified hollow outlet member 110-B provided with a shock detection plate 252. Under normal flow conditions, a small orifice 254 handles the control flow and the lower surface of outlet member 110-B is maintained in sealed sliding engagement with surface 138 on the cylinder barrel. During shock conditions, however, shock detector plate 252 is responsive to excessive fluid flow to the control apparatus or to excessive rates of change of system pressure since orifice 254 is too small to handle high flow rates at excessive rates of pressure increase. Large forces are in these instances developed across shock detection plate 252 in a direction which separates hollow outlet member 110-B separates, the shock flow is released to the crank case of the pump. When the shock conditions terminate, spring 126 and the unbalanced hydraulic forces on outlet member 110-B immediately return the outlet member into sealed sliding engagement with the cylinder barrel and the pump resumes normal operation.

The operation of the pump when modified in accordance with FIG. 5 is identical to that previously described except that cavitation operation is eliminated by maintaining the main suction port 262 at all times in communication with a ball check valve 270 whereby the piston can draw oil into the cylinder throughout its entire suction stroke. Some oil also flows into the cylinder through the smaller by-pass port 264 during the suction stroke.

When piston 62-A reaches bottom dead center and starts on its power stroke the pumping of oil commences as soon as the piston closes smaller by-pass port 264. Since the position of smaller by-pass port 264 is varied, depending on the position of cylinder barrel 70-A, it will be understood that variable displacement control is achieved by moving smaller bypass port 264 in the same manner as such control was achieved by moving intake ports 88 of the pumps of the preceding figures.

With continued reference to FIG. 5, it will be understood that the suction characteristics of the pump are not affected by movement of cylinder barrel 70-A since main intake port 262 is always in communication with the interior of the cylinder, on the suction stroke, via recess 266, passage 282, check valve 270, and passage 278 and slots 280.

Figure 7:
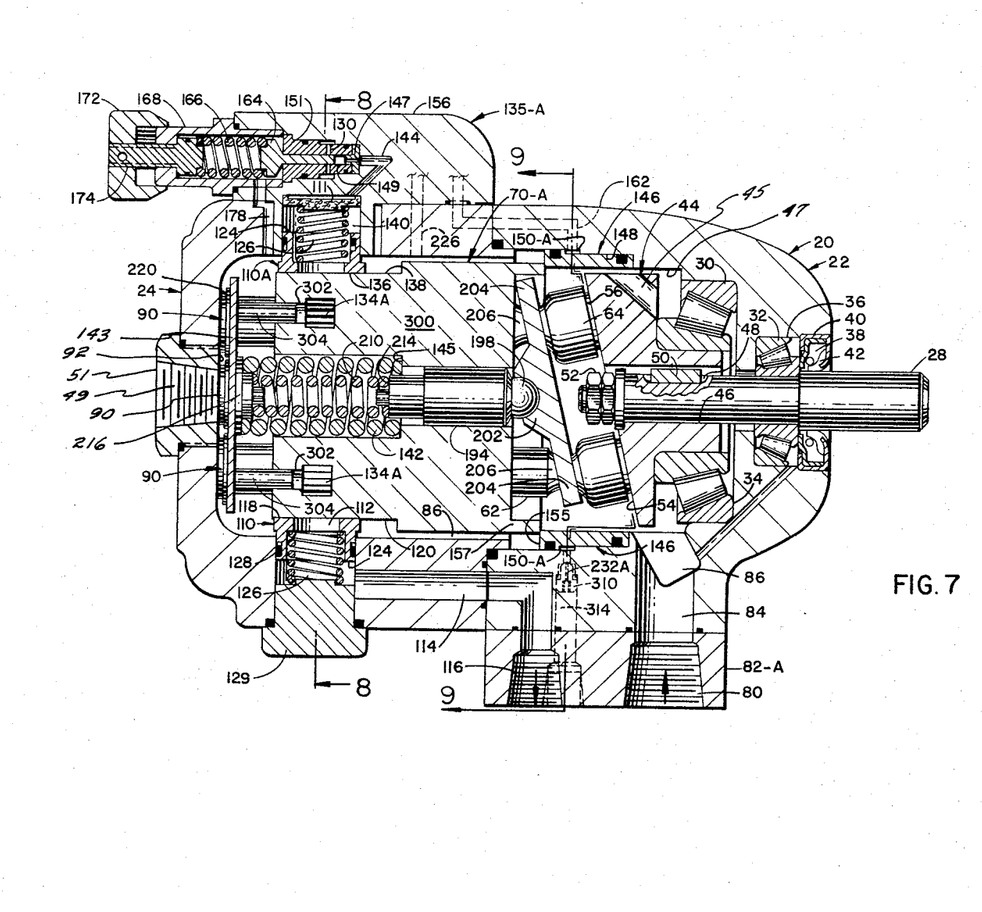
FIG. 7 is a side elevational view of the modified variable displacement pump constructed in accordance with the present invention, this section being taken along the line 7—7 of FIG. 9.
Figure 8:
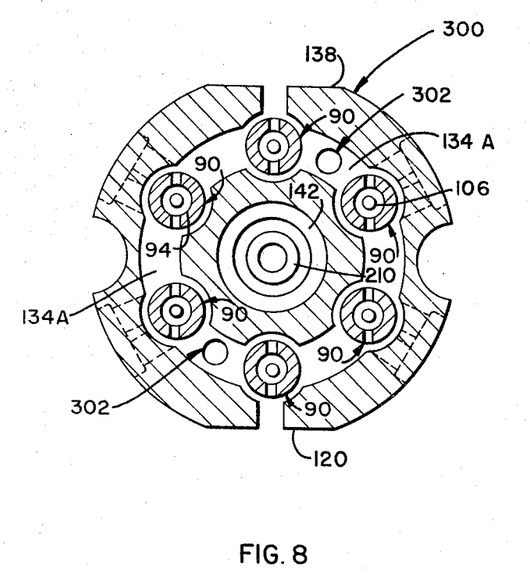
FIG. 8 is an end sectional view of a cylinder barrel comprising a portion of the apparatus of the modified pump of FIG. 7, the section being taken along the line 8—8 of FIG. 7.
Figure 9:
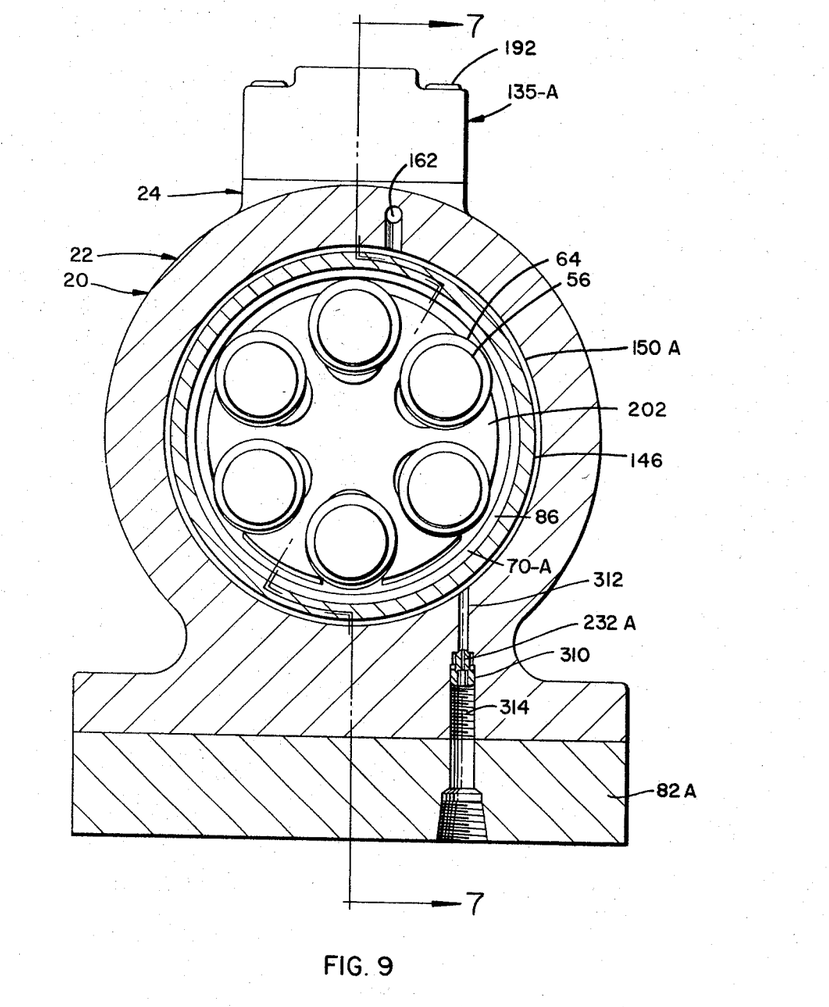
FIG. 9 is an end sectional view of the pump of FIG. 7, the section being taken along the line 9—9 of FIG. 7.

Reference is next made to FIGS. 7-9 which illustrate a modified variable displacement pump constructed in accordance with the present invention.

The structural components of the modified portion of FIGS. 7-9 which are identical to the structural components of the pump of FIGS. 1-3 are designated by identical numerals and the description previously set forth herein, relatively to the modifications of FIGS. 1-2, also applies to the modification of FIGS. 7-9.

With reference to FIGS. 7 and 8, the pump includes a modified cylinder barrel indicated generally at 300 that comprises a modified annular exhaust manifold 134A which communicates with the inner ends of a plurality of bores 302. Each of the bores slideably carries a reaction pin 304 that includes an outer end in force transmitting engagement with spider 143 which in turn abuts the rear wall of the housing means.

In operation of the embodiment of FIGS. 7-9 the pressurized oil in annular exhaust manifold 134-A exerts a force on the inner ends of reaction pins 304 which force is equal to the product of the exhaust pressure and the cross sectional area of the reaction pins. This hydraulic force augments the mechanical force exerted on cylinder barrel 300 by control spring 142 and thence can be utilized to reduce the mechanical spring force required to counteract the barrel shifting force exerted by barrel driving cylinder 150-A.

It should be pointed out that control spring 142 is required, in addition to the hydraulic force exerted by the reaction pins, since the hydraulic force is not present at the starting of the pump.

Reference is next made to FIGS. 7 and 9 which illustrate a novel control flow cooling and exhausting structural feature added to this modified version.

The modification of FIGS. 7–9 include a modified annular barrel driving cylinder 150–A having an outlet passage 312 which provides a dynamic control circuit through the barrel driving cylinder in the embodiment of FIGS. 1–3. This means that the relatively hot pressurized control flow entering the top of the barrel driving cylinder through control passage 162 passes circumferentially around the outer regions of the pump casing in heat exchange relationship with the environment, whereby the control flow is cooled. Moreover, the conrol flow is transferred from the control mechanism 135–A on the top of the pump to the modified subplate 82A on the bottom without the use of external tubing.

At this point it should be pointed out that the control flow in the embodiment of FIGS. 1–3 is returned to the interior of the pump via flow rate control orifice 232, FIG. 3, the vertical passage 226 communicating with the low pressure portion of the casing means.

With the embodiment of FIGS. 7–9 the flow rate control orifice 232 in the flow control mechanism 135 is either eliminated or plugged and replaced by a threaded plug 310 mounted in a threaded hole 314 provided in the bottom of the housing means as seen in FIG. 9. This plug is provided with a flow rate control orifice 232–A that serves the same function as flow rate control orifice 232 as seen in FIG. 3.

In operation of the embodiment of FIG. 9, the relatively hot control flow of oil is continuously circulated through modified barrel driving cylinder 150–A and outwardly through passage 312, flow rate control orifice 232–A and hole 314 to an exterior reservoir, not illustrated, where the control flow is cooled prior to redelivery to the intake passage of the pump.

In both the modifications of FIG. 1 and FIG. 7 centrifugal cooling is achieved by operating the pump with outlet port 49 open whereby a coolant flow from tank is drawn inwardly through inlet port 80 by the suction effect of the centrifugal pumping surface formed by inclined holes 45 through cam means 44. The coolant flow is delivered continuously rearwardly through coolant chamber 86 in heat exchange relationship with cylinder barrel 70, FIG. 1, or cylinder barrel 70–A, FIG. 7. The coolant flow is delivered back to tank via outlet port 49 and a tank rear line 51.

In applications where it is desirable to supercharge intake ports 88 and 88–A, a former restrictor, such as an orifice, can be incorporated in tank rear line 51 in order to provide a positive pressure in rear coolant flow chamber 86. In applications where centrifugal cooling is not deemed to be advantageous, coolant outlet port 49 can be completely closed by a threaded plug screwed into outlet port 49.

It should further be pointed out that in any event, the centrifugal pumping feature of cam means 44 greatly augments starting and priming of the pump by creating suction in intake port 80 and the intake line attached thereto.

It will now be understood that the centrifugal pumping provided by eccentric 44 can be utilized either to effect centrifugal cooling alone, supercharge the intake ports 88, or both, depending on the application and requirements.

It should be further pointed out that the inclined pumping passages 45 are drilled through the thick side of the cam means whereby metal is removed, in controlled amounts, so as to dynamically balance the cam means.

Reference is now made to FIGS. 12–21, which illustrate another modified variable displacement pump constructed in accordance with the present invention.

The structural components of the modified portion of FIGS. 12–21 which are identical to the structural components of the pump of FIGS. 1–3 are designated by identical numerals and the description previously set forth herein, relatively to the modifications of FIGS. 1–2, also applies to the modification of FIGS. 12–21.

Figure 12:
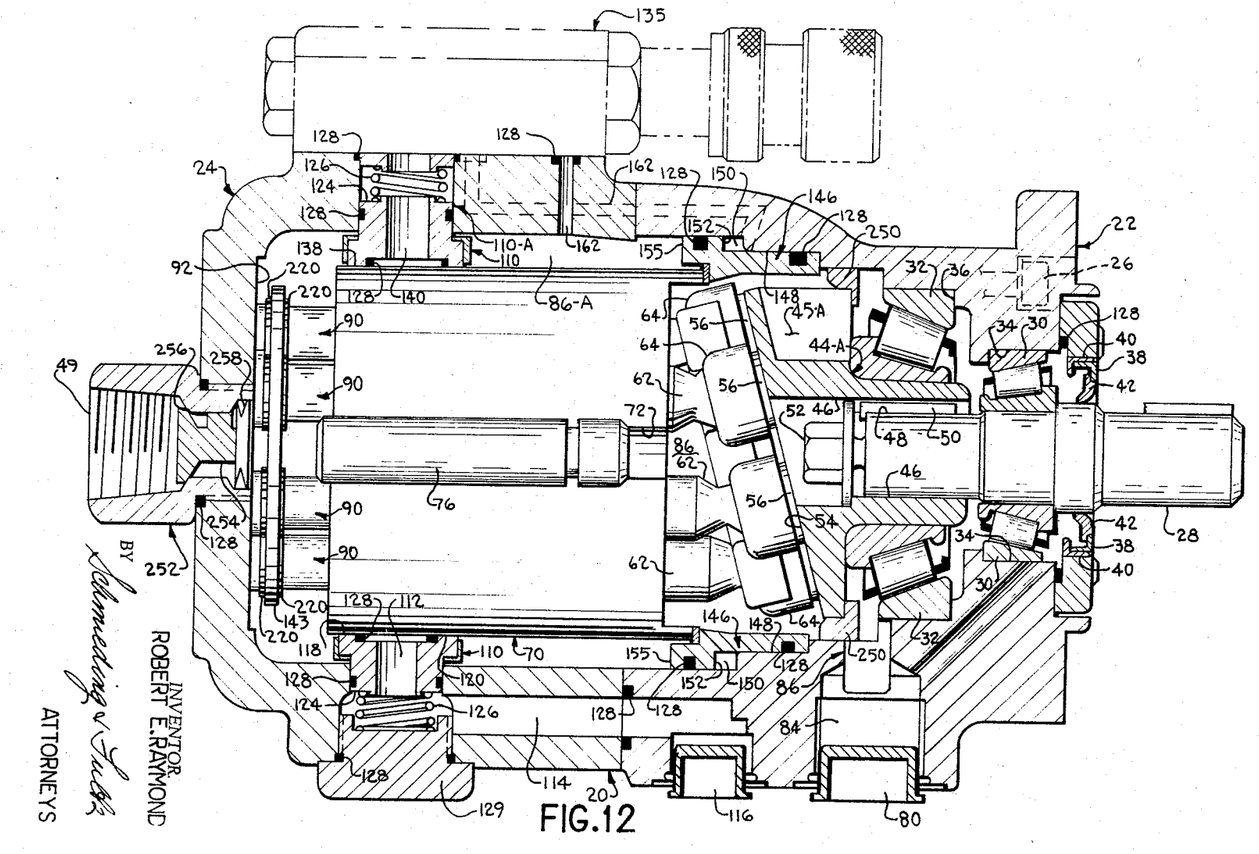
FIG. 12 is a side sectional view of a variable displacement pump similar to the pump illustrated in FIG. 1, but illustrating a modified eccentric and cooling system, the section being taken along a line corresponding to line 1—1 of FIG. 3.
Figure 13:
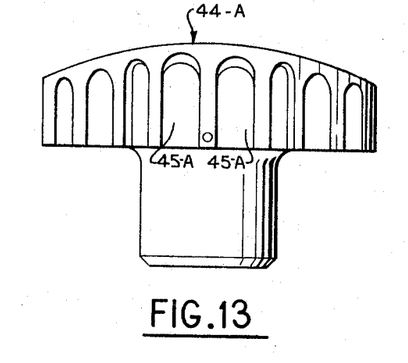
FIG. 13 is a plane view of a modified cam means constructed in accordance with the present invention for the pump illustrated in FIG. 12.
Figure 14:
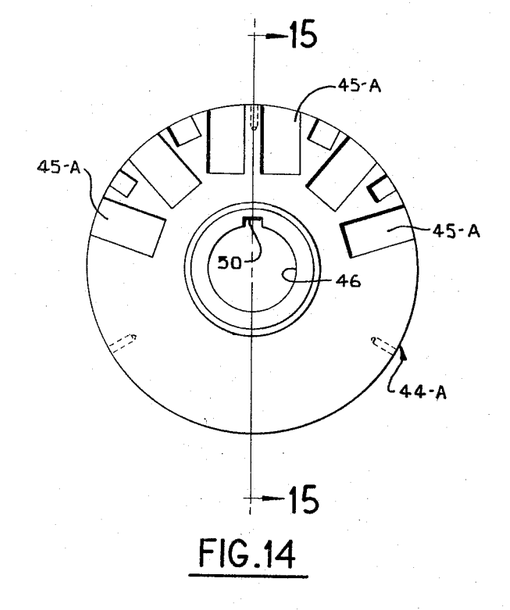
FIG. 14 is a front elevational view of the cam means shown in FIG. 13.
Figure 15:
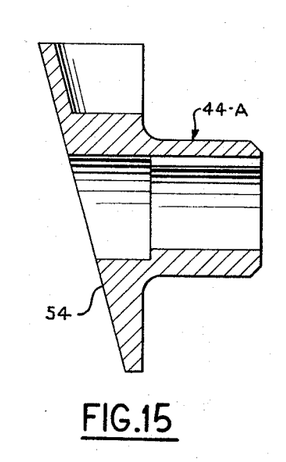
FIG. 15 is a side sectional view of the cam means shown in FIG. 13, the section being taken along line 15—15 of FIG. 14.
Figure 16:
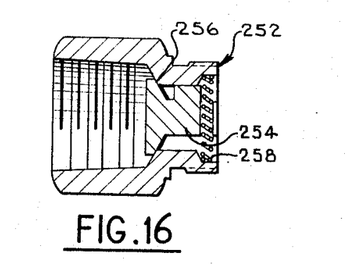
FIG. 16 is a side sectional view of a portion of the modified pump shown in FIG. 12, illustrating an outlet check valve assembly, the section being taken along a vertical plane through the centerline of the valve assembly.
Figures 17, 18:
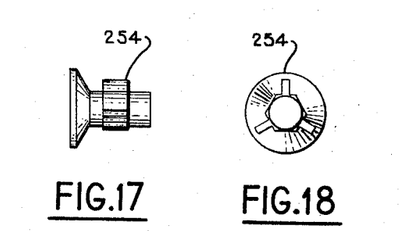
FIG. 17 is a side elevational view of a check valve comprising a portion of the valve assembly shown in FIG. 16.
FIG. 18 is an end elevational view of the check valve shown in FIG. 17.

The embodiment shown in FIGS. 12–21, features a modified cam means 44–A, best seen in FIGS. 13, 14 and 15, which is keyed to shaft 28 by key 50 in key 48.

Figures 19, 20, 21:
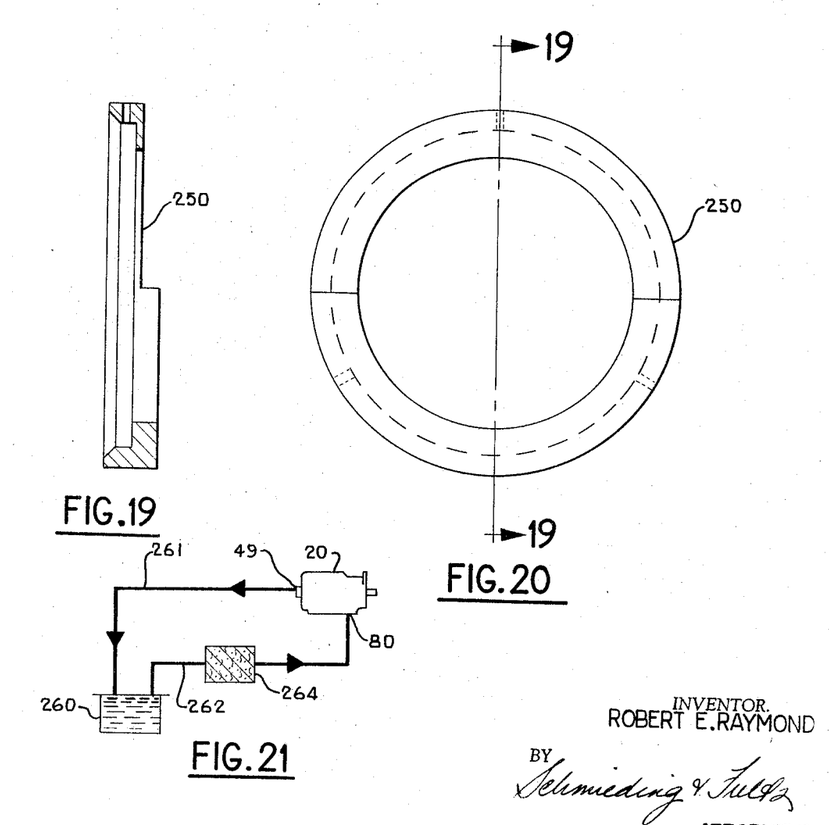
FIG. 19 is a side sectional view of a novel annular seal member for the modified pump of FIG. 12, the section being taken along the line 19—19 of FIG. 20.
FIG. 20 is a front elevational view of the annular seal member shown in FIG. 19.
FIG. 21 is a diagrammatic view of a typical cooling circuit applicable to the embodiment illustrated in FIGS. 12–20.

A novel annular member 250, FIGS. 19 and 20, is attached to the front portion of cam means 44–A and engages the inner wall of housing 20 to divide the interior of the housing means into a forward chamber that receives fluid at tank pressure from intake port 80 and a return chamber 86–A that forms an annular coolant passage between the outer surface cylinder block 70 and the inner surface of housing 20. Coolant outlet port 49 again serves to release the flow of coolant fluid back to tank.

Referring specifically to FIGS. 13, 14 and 15, a front portion of the modified cam means 44–A is provided with a plurality of slots which do not extend through cam means 44–A and which receive intake fluid from intake port 80 and function to impart energy to the fluid upon rotation of the cam means to deliver a flow of coolant fluid through chamber 86 and out of outlet port 49.

Slots 45–A are formed in the thicker portion of cam means 44–A whereby metal is removed in controlled amounts and with the aid of annular member 250, the cam means is dynamically balanced.

With reference to FIG. 12, return chamber 86–A that forms the coolant passage for the centrifugally pumped fluid from cam means 44–A has a relatively large area to carry a larger flow of fluid and therefore provide highly efficient cooling of cylinder block 70.

It is important to point out that in the embodiment of FIGS. 12–21, passage 86–A may be enlarged with no change in size of cam means 44–A because of annular member 250 which functions as part of the cam means and as a seal ring to divide the interior of the housing 20 as previously described.

With reference to FIG. 12 and FIGS. 16, 17, and 18, a check valve assembly indicated generally at 252, is threaded into coolant port 49 and includes a check valve 254 which is biased against a valve seat portion 256 by a spring 258 and prevents the return flow of unfiltered hydraulic fluid from reservoir to the interior of the pump housing.

It is important to point out that other forms of valve means may be used to permit flow in only one direction out of port 49 without departing from the spirit of the present invention.

A typical coolant circuit applicable to the embodiment of FIGS. 12–21, is diagrammatically illustrated in FIG. 21.

Coolant fluid from port 49 flows through line 261 to reservoir 260 and then through line 262 and a filter 264 to inlet port 80 in housing 20.

Therefore only filtered oil enters the interior of housing 20 as check valve assembly prevents flow back through port 49 as previously described.

The operation of the embodiment of FIGS. 12–21 is the same as the embodiment of FIG. 1.

It is important to point out that the embodiment of FIGS. 12–21 is capable of delivering a larger coolant flow and provides a larger coolant passage because of the novel structure of the cam means. Hence, an even more efficient centrifugal cooling system is provided for operations in which a large amount of heat is developed in the pumping apparatus.

While the forms of embodiments of the present invention as herein disclosed constitute preferred forms, it is to be understood that other forms might be adopted, all coming within the scope of the claims which follow:

I claim:

1. A pump comprising, in combination, housing means forming a chamber and including a housing intake port, a separate high pressure outlet port, and a low presure coolant outlet port; cylinder barrel means within said chamber and including barrel wall provided with a cylinder intake port, said barrel wall being spaced from the inner surface of said housing means to provide both a supercharged fluid delivery passage communicating with said cylinder intake port and a coolant passage communicating with said housing coolant outlet port; a plurality of reaction plugs having inner ends slideably disposed in said cylinders and blind out ends freely engaging said housing means, said blind outer ends of said reaction plugs forming fluid reaction surfaces for forcing the reaction plugs against the housing means; piston means mounted for reciprocating movement in said cylinder barrel means; cam means in driving engagement with said piston means and including a centrifugal pumping surface between said housing intake port and an inlet end of said supercharged fluid delivery passage; and check valve means communicating with said housing coolant outlet port to permit fluid to flow out of said coolant outlet port when a predetermined pressure is reached and to prevent fluid to flow into said coolant outlet port.

2. In a hydraulic machine the combination of housing means forming a chamber; a cylinder barrel slideably disposed in said housing means and including a plurality of cylinders, said cylinder barrel including cylinder intake ports communicating with said chamber and an axially extending side wall provided with cylinder outlet ports communicating with said cylinders, said axially extending side wall being spaced from the walls of said chamber to form a coolant passage extending the length of said cylinder barrel; a plurality of reaction plugs having inner ends slideably disposed in said cylinders and blind outer ends freely engaging said housing means; said blind outer ends of said reaction plugs providing fluid reaction surfaces for forcing the reaction plugs against the housing means; a plurality of pistons disposed in said cylinders; means for axially shifting said cylinder barrel in said housing means for varying the location of said cylinder intake ports relative to said pistons; cam means at one end of said coolant passage and in driving engagement with said pistons and including a centrifugal pumping surface for imparting energy to fluid within said chamber and thereby deliver a coolant flow through said coolant passage, said housing means including a coolant low pressure outlet port communicating with a downstream end of said coolant passage, and a separate high pressure outlet port communicating with said cylinder outlet ports.

3. The pump defined in claim 2 wherein said housing means includes an end wall forming a shaft bearing mounting recess and a housing intake port; a minor passage connecting said bearing mounting recess with said housing intake port and a major passage connecting said coolant passage with said housing intake port.

4. The pump defined in claim 2 wherein said coolant outlet port is in a wall of said housing means remote from said centrifugal pumping surface.

5. In a hydraulic machine the combination of housing means forming a chamber; a cylinder barrel slideably disposed in said housing means and including a plurality of cylinders provided with cylinder intake and cylinder outlet ports, communicating with said chamber, each of said cylinder ports having an outlet at an axially extending outer peripheral surface of said cylinder barrel, said outer surface of said cylinder barrel being spaced from the inner surface of said housing means to form a coolant passage extending the length of said cylinder barrel; a plurality of pistons disposed in said cylinders; a hollow outlet member mounted in said housing means and including an inner surface slideably engaging said outer peripheral surface of said cylinder barrel and an outlet passage communicating with one of said outlet ports; means for axially shifting said cylinder barrel in said housing means for varying the location of said cylinder intake ports relative to said pistons; and cam means at one end of said coolant passage and in driving engagement with said pistons and including a centrifugal pumping surface for imparting energy to fluid within said chamber and thereby deliver a coolant flow through said coolant passage, said housing means including a coolant outlet port communicating with a downstream end of said coolant passage, and a separate high pressure outlet port communicating with said cylinder outlet ports.

6. The pump defined in claim 5 wherein said housing means includes an end wall forming a shaft bearing mounting recess and a housing intake port; a minor passage connecting said bearing mounting recess with said housing intake port and a major passage connecting said coolant passage with said housing intake port.

7. The pump defined in claim 5 wherein said coolant outlet port is in a wall of said housing means remote from said centrifugal pumping surface.

8. In a hydraulic machine the combination of housing means forming a chamber; a cylinder barrel slideably disposed in said housing means and including a plurality of cylinders provided with cylinder intake ports communicating with said chamber and an outer surface of said cylinder barrel being spaced from the inner surface of said housing means to form a coolant passage extending the length of said cylinder barrel; a plurality of pistons disposed in said cylinders; a barrel driving cylinder in said housing means; an annular piston disposed in said barrel driving cylinder and engaging said cylinder barrel for varying the location of said cylinder intake ports relative to said pistons; and means at one end of said coolant passage and in driving engagement with said pistons and including a centrifugal pumping surface for imparting energy to fluid within said chamber and thereby deliver a coolant flow through said coolant passage, said housing means including a coolant outlet port communicating with a downstream end of said coolant passage, and a separate high pressure outlet port communicating with said cylinder outlet ports.

9. The pump defined in claim 8 wherein said housing means includes an end wall forming a shaft bearing mounting recess and a housing intake port; a minor passage connecting said bearing mounting recess with said housing intake port and a major passage connecting said coolant passage with said housing intake port.

10. The pump defined in claim 8 wherein said coolant outlet port is in a wall of said housing means remote from said centrifugal pumping surface.

11. In a hydraulic machine the combination of housing means forming a chamber; a cylinder barrel slideably disposed in said housing means and including a central axially extending bore, a plurality of axially extending pistons, a plurality of cylinders provided with cylinder intake ports communicating with said chamber, and an outer barrel surface spaced from the inner surface of said housing means to form a coolant chamber extending the length of said cylinder barrel; a plurality of pistons disposed in said cylinders; cam means at one end of said coolant passage and engaging said pistons, said eccentric including a centrifugal pumping surface for imparting energy to fluid in said chamber and thereby deliver a coolant flow through said coolant passage, said housing means including a coolant outlet port communicating with a downstream end of said coolant passage and a separate high pressure outlet port communicating with said cylinder outlet ports; a piston return yoke connected to said pistons; a piston return rod slideably disposed in said axially extending bore in said cylinder barrel; means biasing said piston return rod against said piston return yoke; and means for axially shifting said cylinder barrel in said housing means for varying the location of said cylinder intake ports relative to said pistons.

12. The pump defined in claim 11 wherein said housing means includes an end wall forming a shaft bearing mounting recess and a housing intake port; a minor passage connecting said bearing mounting recess with said housing intake port and a major passage connecting said coolant passage with said housing intake port.

13. The pump defined in claim 11 wherein said coolant outlet port is in a wall of said housing means remote from said centrifugal pumping surface.

14. A pump comprising, in combination, housing means forming a chamber; cylinder barrel means mounted in said chamber and including an outer wall portion spaced from the inner wall of said housing means to form a coolant passage extending the length of said barrel means; piston means mounted for reciprocating movement in said barrel means; cam means at one end of said coolant passage and in driving engagement with said piston means and including a centrifugal pumping surface formed by a slot in the periphery of said cam means for imparting energy to fluid within said chamber; and an annular member on the periphery of said cam means and forming a seal with said inner wall of said housing means and a closure for the ends of said slots.

15. A pump comprising, in combination, housing means forming a chamber; cylinder barrel means mounted in said chamber and including an outer wall portion spaced from the inner wall of said housing means to form a coolant passage extending the length of said barrel means; piston means mounted for reciprocating movement in said barrel means; cam means at one end of said coolant passage and in driving engagement with said piston means and including a centrifugal pumping surface formed by a slot in the periphery of said cam means for imparting energy to fluid within said chamber; and an annular member on the periphery of said cam means and forming a seal with said inner wall of said housing means and a closure for the ends of said slots, said annular member including a heavier peripheral portion on one side thereof that adds balancing weight to a lighter side of said cam means.

16. In a hydraulic machine the combination of housing means forming a chamber; a cylinder barrel slideably disposed in said housing means and including a plurality of cylinders, said cylinder barrel including cylinder intake portions communicating with said chamber and an axially extending side wall provided with cylinder outlet ports communicating with said cylinders, said axially extending side wall being spaced from the walls of said chamber to form a coolant passage; a plurality of reaction plugs having inner ends slideably disposed in said cylinders and outer ends freely engaging said housing means, means for axially shifting said cylinder barrel in said housing means for varying the location of said cylinder intake ports relative to said pistons; a plurality of pistons disposed in said cylinders; cam means at one end of said coolant passage and in driving engagement with said pistons and including a centrifugal pumping surface formed by a slot in the periphery of said cam means for imparting energy to fluid within said chamber; and an annular member on the periphery of said cam means and forming a seal with said inner wall of said housing means and a closure for the ends of said slots.

17. In a hydraulic machine the combination of housing means forming a chamber; a cylinder barrel slideably disposed in said housing means and including a plurality of cylinders, said cylinder barrel including cylinder intake ports communicating with said chamber and an axially extending side wall provided with cylinder outlet ports communicating with said cylinders, said axially extending side wall being spaced from the walls of said chamber to form a coolant passage; a plurality of reaction plugs having inner ends slideably disposed in said cylinders and outer ends freely engaging said housing means, means for axially shifting said cylinder barrel in said housing means for varying the location of said cylinder intake ports relative to said pistons; a plurality of pistons disposed in said cylinders; cam means at one end of said coolant passage and in driving engagement with said pistons and including a centrifugal pumping surface formed by a slot in the periphery of said cam means for imparting energy to fluid within said chamber; and an annular member on the periphery of said cam means and forming a seal with said inner wall of said housing means and a closure for the ends of said slots, said annular member including a heavier peripheral portion on one side thereof that adds balancing weight to a lighter side of said cam means.

References Cited by the Examiner

UNITED STATES PATENTS

| | | | |
|---|---|---|---|
| 2,385,990 | 10/1945 | Huber | 103—173 |
| 2,554,047 | 5/1951 | Moon | 103—202 |
| 2,620,733 | 12/1952 | Overbeker | 103—5 |
| 2,847,938 | 8/1958 | Gondek | 230—207 |
| 2,858,771 | 11/1958 | Cornelius | 103—202 |
| 2,990,781 | 8/1961 | Tuck et al. | 103—173 |
| 3,067,694 | 12/1962 | Fancher | 103—173 |
| 3,085,514 | 4/1963 | Budzich | 103—173 |
| 3,108,544 | 10/1963 | Pescue | 230—208 |
| 3,183,847 | 5/1965 | Raymond | 103—173 |
| 3,209,701 | 10/1965 | Phinney | 103—173 |

DONLEY J. STOCKING, *Primary Examiner.*

SAMUEL LEVINE, MARK NEWMAN, *Examiners.*

W. L. FREEH, *Assistant Examiner.*